(No Model.) 2 Sheets—Sheet 2.
E. R. KIRK.
POTATO MASHER AND BEATER.
No. 431,984. Patented July 8, 1890.
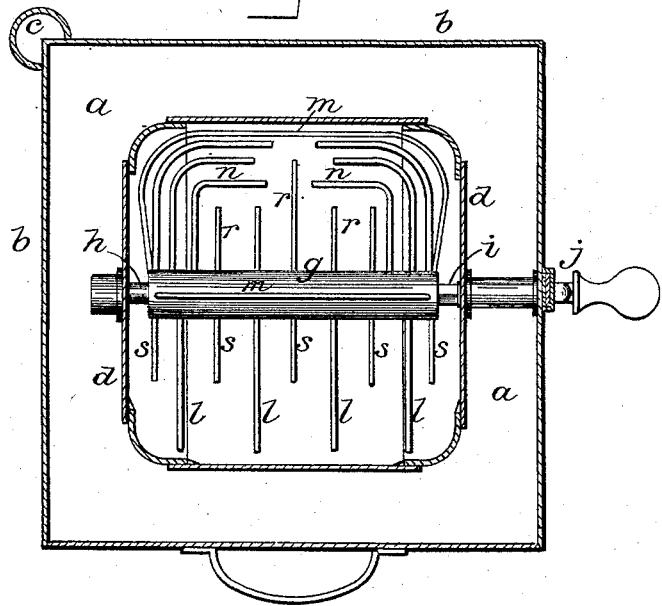
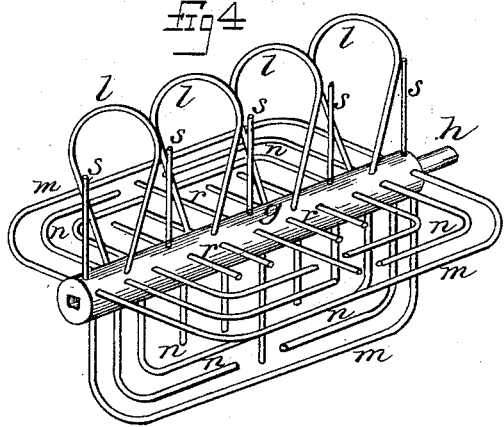
WITNESSES:
Philip F. Larner
Howell Battle
INVENTOR
Elizabeth R. Kirk
BY Johnson & Johnson
ATTORNEYS.

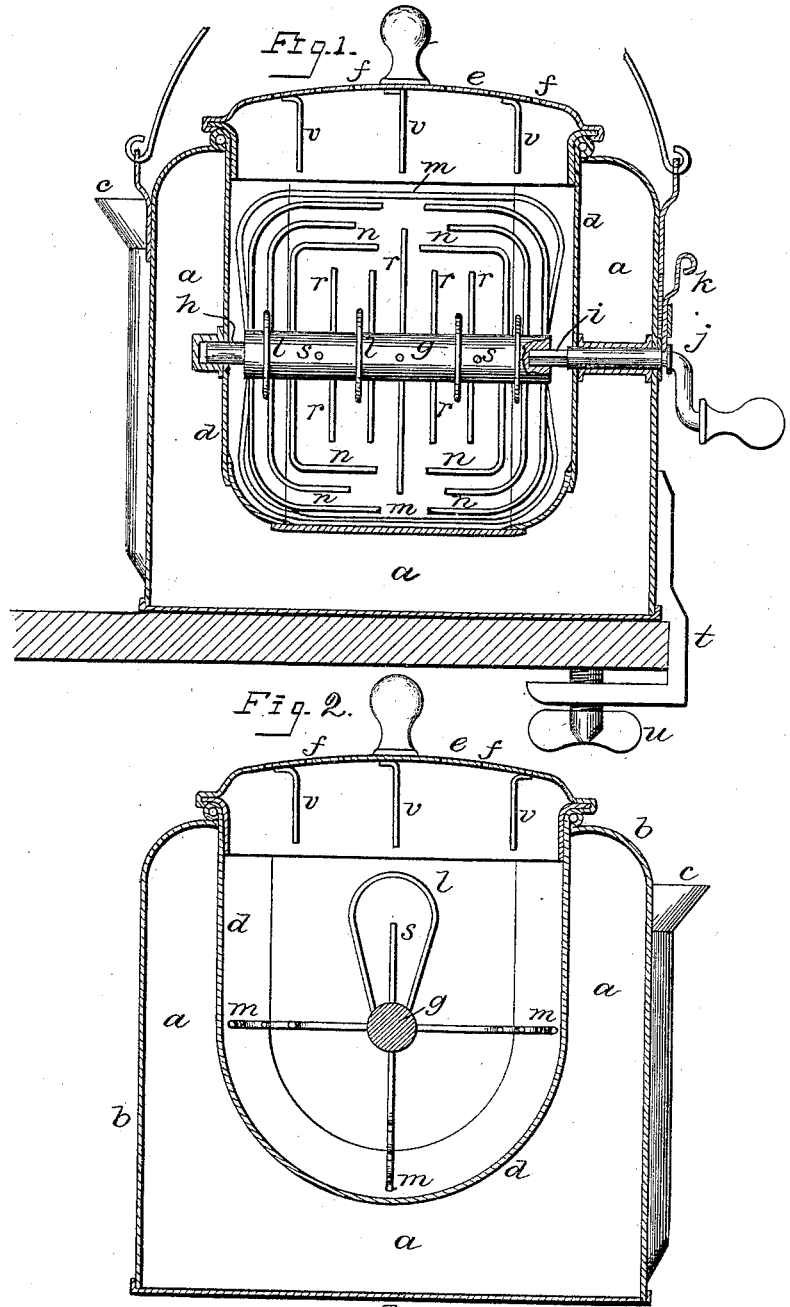

UNITED STATES PATENT OFFICE.

ELIZABETH R. KIRK, OF WEST CHESTER, PENNSYLVANIA.

POTATO MASHER AND BEATER.

SPECIFICATION forming part of Letters Patent No. 431,984, dated July 8, 1890.

Application filed May 14, 1890. Serial No. 351,738. (No model.)

*To all whom it may concern:*

Be it known that I, ELIZABETH RICHARDS KIRK, a citizen of the United States, residing at West Chester, in the county of Chester and State of Pennsylvania, have invented a new and useful Improvement in Potato Mashers and Beaters, of which the following is a specification.

My invention is directed to the production of an improved device for mashing and beating potatoes and preparing them for the table; and the object of my improvement is to effect the perfect mashing and beating of the potatoes and in serving in the first or cooking heat. For this purpose I have devised a revolving beater of certain construction for use in a heat-retaining vessel, which I have found to give better satisfaction than any article for the purpose which I have been able to buy in the stores for use in my hotel, and the precise improvement will be pointed out in the claims concluding this specification.

Referring to the accompanying drawings, Figure 1 is a longitudinal vertical section of my improved potato masher and beater, the revolving body being shown in elevation. Fig. 2 is a vertical cross-section of the same. Fig. 3 is a horizontal section of the same, and Fig. 4 shows the revolving beater-body in perspective.

The vessel or casing is made of tin double-walled, with an intervening chamber $a$ entirely around its vertical sides and bottom for receiving hot water, whereby the vessel is heated to retain the heat of the potatoes in preparing them for the table.

The outer casing $b$ is preferably square with a flat bottom, and is provided with a top funnel-opening $c$ for introducing the hot water into and emptying it from the heating-chamber.

The inner casing $d$ is made with a circular bottom and is closed by a cover $e$, which has holes $f$, to allow for the escape of the steam in mashing and beating the potatoes. The revolving wire masher and beater is mounted horizontally within this casing by a shaft $g$, having a journal-bearing $h$ at one end which fits in a socket in the inner vertical wall, so that there is no opening into the water-chamber. The other end of the shaft has a square socket to receive the square end $i$ of a short operating crank-shaft $j$, which passes through an opening in the opposite double wall, has its bearing therein, and is retained in its connection with the masher-shaft by a latch $k$, secured on the outer casing, so as to fit over a collar on the crank-shaft, so that the latter can be removed to remove the masher from the vessel.

The form and arrangement of the wires upon the shafts which I have found most effective and satisfactory for preparing potatoes for the table are shown in Fig. 4. These wires are suitably set or secured in the shaft in longitudinal rows and are of sufficient size to be stiff and rigid. I find that four rows are enough for vessels having a capacity for a half or a quarter peck of potatoes, and in one of these rows I form some of the wires of transverse bows or loops $l$, so as to act as cutters to divide the potatoes into smaller pieces, and for this purpose these bows or loops revolve edgewise in the direction of their motion. In the other rows the outer wires form loops or bows $m$ parallel with the shaft, so as to act as scrapers to prevent the potatoes from adhering on the rounded bottom and vertical walls of the chamber, and for this purpose these bows or loops are of the same length as the shaft and their ends are radial. The space within these scraper-forming bows is filled in by two or more L-shaped wires $n$, the horizontal ends of which are parallel with the scraper-bows and leave a space between them in the middle of the length of said scraper-bows, while the space between the inner of these L-shaped wires is filled by radial wires $r$, the middle one of which extends in the space between the ends of the L-shaped wires. Short radial wires $s$ are arranged between the transverse cutter bows or loops. The wires thus disposed and formed when revolved give perfectly reducing action on the potatoes and mash them into the desired condition, during which the steam passes off through the top perforations. The cream and seasoning are then put into the vessel and the masher again revolved to prepare the potatoes for the table.

It is important to notice that the wires, which serve chiefly to reduce and mash the potatoes, are not connected to each other, and while this construction and arrangement renders such mashing action perfect it gives the advantage of allowing the masher to be freed of the potatoes in taking it out of the chamber. This is done by shaking the masher before lifting out, when it will be found that the potatoes will readily fall from between the disconnected wires. Were these wires all connected together within the space of the scraper bows or loops they would tend to fill and hold the mashed potatoes in removing the masher-body, and thus be objectionable.

The case is provided with a clamp formed of an L-shaped bracket $t$, provided with a clamp-screw $u$, by which it is secured to a table. The radial wires may be staggered in the shaft and set the proper distance apart. In placing the potatoes in the vessel the revolving masher should be set so as that the transverse bows will first act to divide them, and for this purpose act edgewise and are much stronger than the other wires, the disposition and form of which mash and beat the potatoes into the desired fineness and thoroughly mix with the cream and seasoning.

I may provide the cover with wires $v$ projecting downward from its under side and arranged in rows or otherwise and of any suitable form, so as to co-operate with the revolving beating-wires in mashing and beating the potatoes.

I claim as my improvement—

1. In a potato masher and beater, the combination of a jacketed heating-vessel, a detachable masher and beater having a shaft provided with rows of wires, in one of which rows there are transverse bows or loops $l$, with intermediate short wires $s$, the other rows being formed of an outer scraper bow or loop $m$, the space within which is filled with L-shaped wires $n$ and short radial wires $r$, and means for revolving said masher and beater, as shown and described.

2. In a potato masher and beater, the revolving body formed of a center shaft having a journal-bearing at one end and a square socket in the other end, longitudinal rows of wires, the wires of one row being bows or loops $l$, arranged transversely with the shaft, and short wires $s$ between said bows, the wires of the other rows being formed of an outer scraping bow or loop $m$, inner L-shaped wires $n$ at each end, and short radial wires $r$, the middle one of which extends into the space between the ends of the said L-shaped wires, substantially as described.

3. The potato masher and beater herein described, consisting of the jacketed heating-vessel having a cover provided with holes, a clamp at its lower edge, registering journal-openings in said double walls, a detachable masher and beater formed of a center shaft having a journal-bearing at one end and a square socket in the other end, longitudinal rows of wires, the wires of one row being transversely arranged, cutter-bows $l$, and short intermediate wires $s$, the other rows formed of an outer scraper-bow, inner L-shaped wires $n$ at each end, and radial short wires $r$, and a detachable crank-shaft for revolving the masher and beater, substantially as described.

4. In a potato-masher, the combination of a jacketed heating-vessel, a detachable masher and beater shaft provided with wires suitably arranged to mash and beat the potatoes, means for revolving said masher and beater, and a removable cover provided with coacting wires projecting downward from its under side, as herein set forth.

In testimony whereof I have hereunto set my hand in the presence of two subscribing witnesses.

ELIZABETH R. KIRK.

Witnesses:
HORACE M. PHILIPS,
S. S. PEARSON.